(12) United States Patent
Torisu et al.

(10) Patent No.: US 6,334,747 B1
(45) Date of Patent: Jan. 1, 2002

(54) NUT, BOLT, AND THREAD UNIT OF FEMALE AND MALE THREAD MEMBERS

(75) Inventors: Makoto Torisu; Ryuji Suzuki; Keiji Nomura, all of Nishio (JP)

(73) Assignee: Sugiura Seisakusho Co., Ltd., Aichi (JP)

( * ) Notice: Subject to any disclaimer, the term of this patent is extended or adjusted under 35 U.S.C. 154(b) by 0 days.

(21) Appl. No.: 09/667,817

(22) Filed: Sep. 22, 2000

(30) Foreign Application Priority Data

| Sep. 24, 1999 | (JP) | 11-309757 |
| Sep. 24, 1999 | (JP) | 11-309758 |
| Sep. 30, 1999 | (JP) | 11-280267 |
| Feb. 4, 2000 | (JP) | 12-028216 |

(51) Int. Cl.$^7$ ............... F16B 25/00; F16B 35/04
(52) U.S. Cl. ............... 411/386; 411/417; 411/437
(58) Field of Search ............... 411/386, 411, 411/416, 417, 418, 424, 436, 437

(56) References Cited

U.S. PATENT DOCUMENTS

| 4,789,288 A | * | 12/1988 | Peterson | 411/386 |
| 4,907,930 A | * | 3/1990 | Peterson | 411/437 |
| 4,915,560 A | * | 4/1990 | Peterson et al. | 411/386 X |
| 5,064,327 A | * | 11/1991 | Hughes | 411/417 X |
| 5,073,073 A | | 12/1991 | Kazino et al. | |
| 5,609,455 A | * | 3/1997 | McKewan | 411/386 |
| 5,791,849 A | | 8/1998 | Goodwin | |

OTHER PUBLICATIONS

Japanese Patent Office, Patent Abstracts of Japan, Publication No.: 08082314, Publication Date: Mar. 26, 1996, Application No. 06241997, Application Date: Sep. 9, 1994, vol 1996, No. 7, *English Language Abstract* and Japanese Language Laid–Open Application pp. 87 –92.

* cited by examiner

*Primary Examiner*—Neill Wilson
(74) *Attorney, Agent, or Firm*—Snider & Associates; Ronald R. Snider

(57) ABSTRACT

The nut has a tool engaging region or a hexagonal region and a flange region provided on a thread end of the hexagonal region. A sloped step sloping at an angle to the center line of the nut is provided on the thread end. The sloped step (surface) is thus shaped of the annular form on the inner wall of the nut adjacent to the nut opening which faces outwardly of the nut and substantially extends along the loop.

16 Claims, 14 Drawing Sheets

NUT, BOLT, AND THREAD UNIT OF FEMALE AND MALE THREAD MEMBERS

RELATED APPLICATION

This application claims the priority of Japanese Patent Applications No.11-309757 filed on Sep. 24, 1999, No.11-309758 filed on Sep. 24, 1999, No.11-280267 filed on Sep. 30, 1999 and No. 2000-28216 filed on Feb. 4, 2000, which are incorporated herein by reference.

BACKGROUND OF THE INVENTION

1. Field of the Invention

The present invention relates to a technique for smoothly threading (screwing) between a female thread member and a male thread member such as a nut and a bolt.

2. Description of the Related Art

When a male thread member such as a bolt is threaded at its tilted state to a female thread member such as a nut for tightening to each other, the bolt may possibly bite the nut. If their threading is forced regardless of biting, their threads may severely be injured or fractured.

SUMMARY OF THE INVENTION

It is thus an object of the present invention to provide a technology for allowing a pair of thread members such as a bolt and a nut to be smoothly threaded (engaged) with each other while readily correcting their dislocation or tilting from each other.

A nut according to the present invention is characterized by an annular sloped step provided in a region of the inner wall adjacent to the opening end of the nut to substantially extend along an oval shaped loop (an annular line) defined by an intersection between the inner wall of the nut and a plane tilted at an angle to the crosswise plane perpendicular to the center line of the nut so that the annular sloped step faces outwardly of the nut for ease of corrective threading (engaging), wherein the diameter of the inner edge of the sloped step along the crosswise plane perpendicular to the center line of the nut (at a right angle to the axis) is smaller than the major diameter of a female thread of the nut and the female thread extends inwardly from the sloped step.

As the annular sloped step is provided along the oval shape loop tilted from the axis of the nut, it can act as a slope cam or a tilt cam (together with the inner edge) when the nut to be threaded with a bolt is tilted from the axis of the bolt and turned one full revolution about the bolt, thus generating such a force of moment as to eliminate the tilting of the nut. Accordingly, even if the nut and the bolt are tilted from each other, their state can be corrected by the action of corrective threading so that the nut and the bolt are smoothly threaded with each other. The term "step" includes its inner edge (the inner wall at the edge) and a "step" may be expressed by a "stepped portion".

The nut having the above arrangement may be modified in that a tubular guide is provided concentrically about the center line of the nut on a region of the inner wall of the nut on the opening end side of the annular sloped step where no female thread is formed, the inner diameter of the tubular guide arranged greater than the diameter of the inner edge of the annular sloped step at a right angle to the axis and slightly greater than the major diameter of the female thread of the nut, and the tubular guide connects to the annular sloped step.

As the tubular guide is provided inwardly of the sloped step in addition to the sloped step which acts as a slope cam or a tilt cam, it can roughly correct the dislocation or tilting of the nut from the bolt before the sloped step (stepped portion) completely eliminates the dislocation or tilting by its cam action, hence contributing to the more ease of the corrective threading. In view of a guiding action, the tubular guide may be provided separately. However, when the tubular guide and the sloped step are provided in a combination at two step relationship, the length (stroke) of the tubular guide can be minimized and the length of the female thread largely affecting the tightening strength can be increased. Also, the tubular guide acts as a fulcrum of the (physical moment) cam action of the sloped step while the nut accepts a bolt in its tilted state.

Alternatively, the nut may be modified in that a beveled guide is provided concentrically of the female thread of the nut on an opening end region of the inner wall of the nut so that its inner diameter become greater towards the opening end and the sloped step extends inwardly from the smaller inner diameter end of the beveled guide. As the beveled guide and the sloped step act in a combination, they can readily correct any dislocation or tilting of the nut from the bolt. It is also a good idea that the beveled guide is connected at its smaller diameter end to the tubular guide which is in turn connected at its innermost end to the sloped step to form a three step arrangement. Their cooperating actions can also favorably correct the dislocation or tilting of the nut.

While the embodiments are feasible in the form of a nut, a bolt according to the present invention is characterized by a corrective threading (engaging) step provided in a region of the outer surface adjacent to the leading end of the bolt to substantially extend along an oval shaped loop (an annular line) defined by an intersection between the outer surface of the bolt and a plane tilted at an angle to the crosswise plane perpendicular to the center line of the bolt, wherein the diameter of the outer edge of the corrective threading step along the crosswise plane perpendicular to the center line of the bolt (at a right angle to the axis) is greater than the minor diameter of a male thread of the bolt and the male thread extends rearwardly from the corrective threading step.

As the corrective threading step is provided along the oval shaped loop tilted from the axis of the bolt, it can act as a slope cam or a tilt cam (together with the outer edge) when the bolt to be treaded with a nut is tilted from the axis of the nut and turned one full revolution relative to the nut, thus generating such a force of moment as to eliminate the tilting of the bolt. Accordingly, even if the bolt and the nut are tilted from each other, their state can be corrected by the action of corrective threading so that the bolt and the nut are smoothly threaded with each other.

The bolts having the above arrangement may be modified in that a cylindrical guide projection is provided concentrically about the center line of the bolt on a region of the outer surface of the bolt at the leading end side of the annular corrective threading step, the outer diameter of the guide projection arranged slightly smaller than the minor diameter of the male thread of the bolt.

As the guide projection is provided at the front side of (or frontwardly of) the corrective threading step in addition to the corrective threading step which acts as a slope cam or a tilt cam, it can roughly correct the dislocation or tilting of the bolt from the nut before the annular corrective threading step completely eliminates the dislocation or tilting of the axis by its cam action, hence contributing to the more ease of the corrective threading. In view of a guiding action, the guide projection may be provided separately. However, when the guide projection and the corrective threading step are provided in a combination at two step relationship, the length (distance) of the guide projection can be minimized and the length of the male thread largely affecting the tightening strength can be increased. Also, the guide projection acts as a fulcrum of the (physical moment) cam action of the annular corrective threading step while the bolt receives a nut in its tilted state.

Moreover, as the embodiments are described in the form of a nut or a bolt separately, a combination of a female (internal) thread member and a male (external) thread member is feasible according to the present invention; more particularly, a thread unit of a female thread member and a male thread member (unit for engaging a female thread member and a male thread member).

The thread unit of a female thread member and a male thread member is characterized in that the female thread member has an annular sloped step or female-thread side corrective threading step provided (as above described) to substantially extend along an oval shaped loop tilted from the axis of the female thread member (a nut or the like), while the male thread member has a male-thread side corrective threading step provided (as above described) to substantially extend along an oval shaped loop tilted from the axis of the male thread member (a bolt or the like). In action, as the female thread member and the male thread member to be threaded with each other are turned relative to each other, their respective corrective threading steps can engage directly with each other. More specifically, when a nut and a bolt to be threaded with each other are positioned at unfavorably their axially tilted states and turned one full revolution relative to each other, their respective corrective threading steps (including the edges) act as slope cams or tilt cams thus generating such a force of moment as to eliminate their tilting states. As a result, the nut and the bolt which are fairly tilted to each other can readily be corrected in the relative position by their action of corrective threading and smoothly threaded with each other.

DETAILED DESCRIPTION OF THE PREFERRED EMBODIMENTS

Some embodiments of the present invention will be described in the form of firstly nuts, then bolts, and finally a threaded unit of a nut and a bolt, referring to the accompanying drawings.

Figure 1:
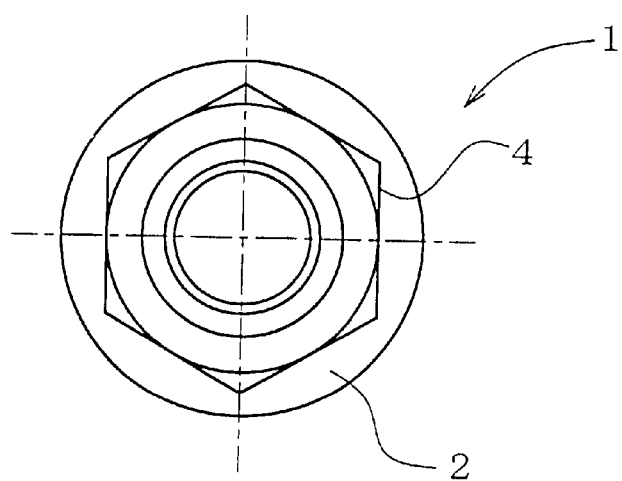
FIG. 1 is a front view of a nut showing an embodiment of the present invention.
Figure 2:
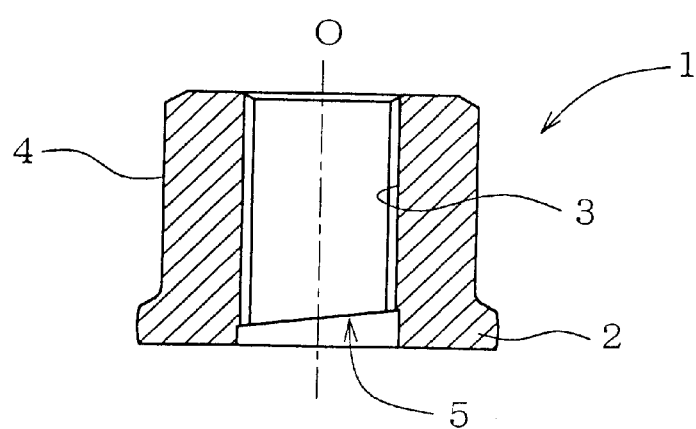
FIG. 2 is a longitudinal cross sectional view of the nut.
Figure 3:
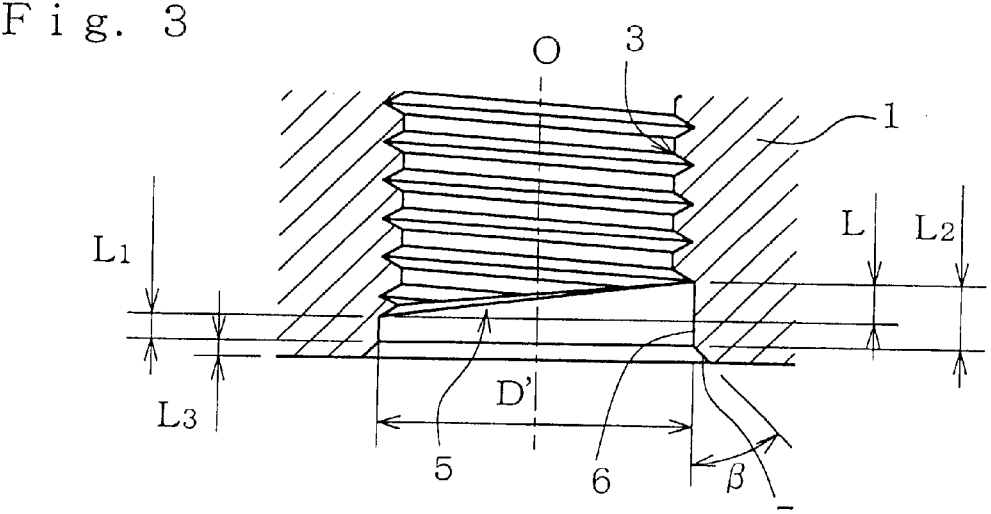
FIG. 3 is an enlarged cross sectional view of the nut shown in FIG. 2.

FIGS. 1 to 3 illustrate a nut1 of one embodiment of the present invention. The nut1 has a tool engaging region or a hexagonal region4 and a flange region2 provided on a thread end of the hexagonal region4. A sloped step5 sloping at an angle to the center line O of the nut1 is provided on the thread end. The sloped step5 is explained in more detail referring to FIGS. 4 to 7.

Figure 4:
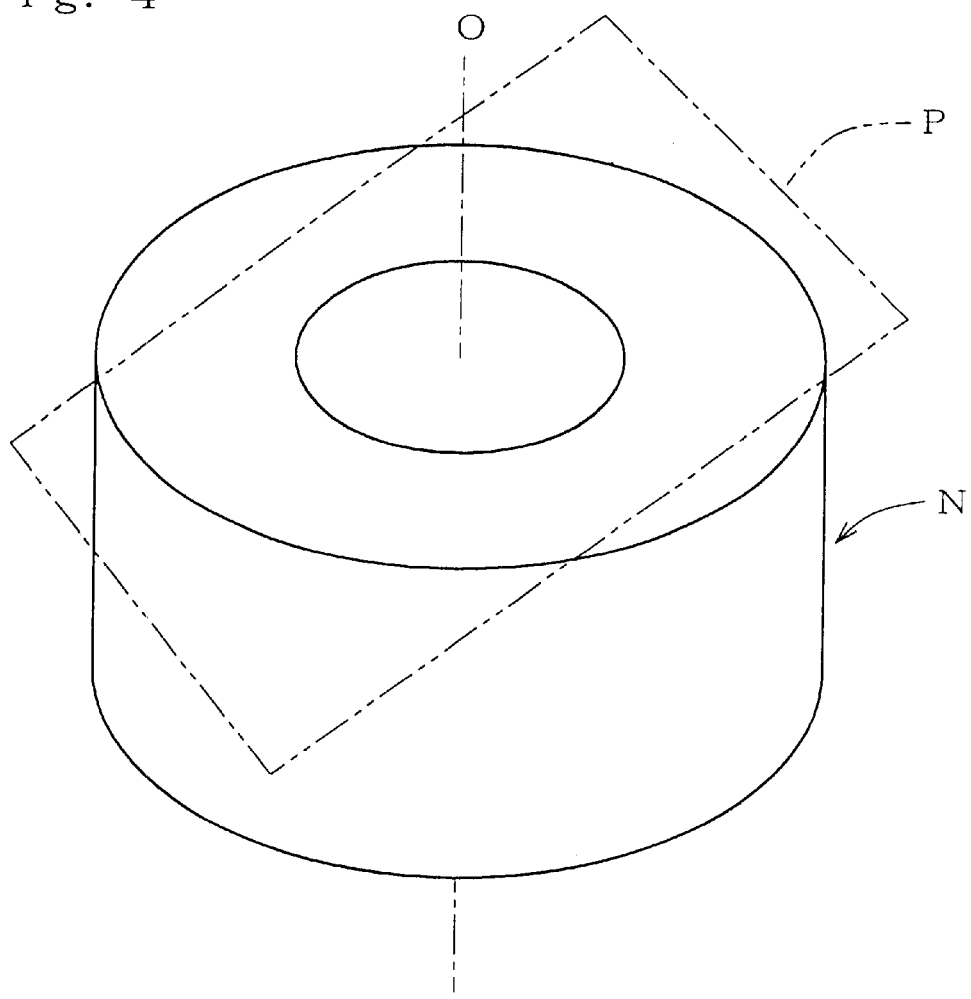
FIG. 4 is a perspective view explaining a concept of the sloped step.
Figure 5:
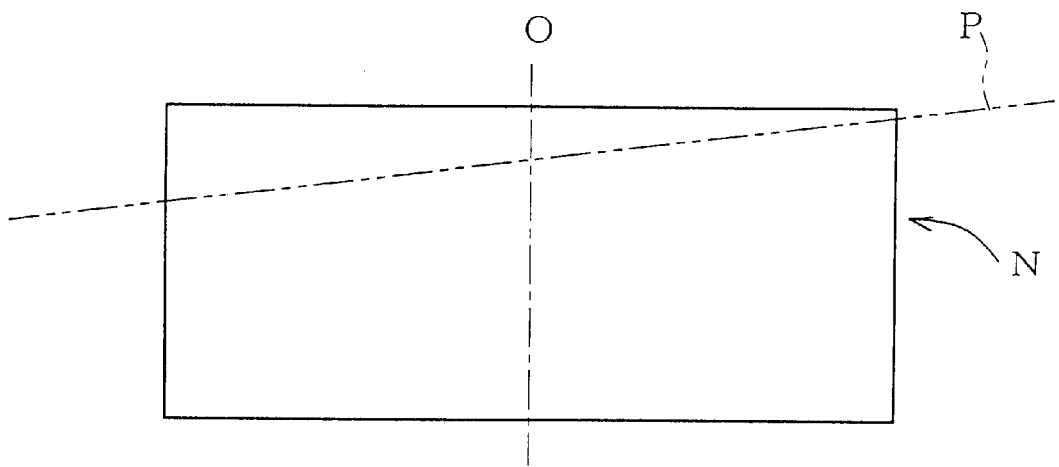
FIG. 5 is a side view of the nut shown in FIG. 4.
Figure 6:
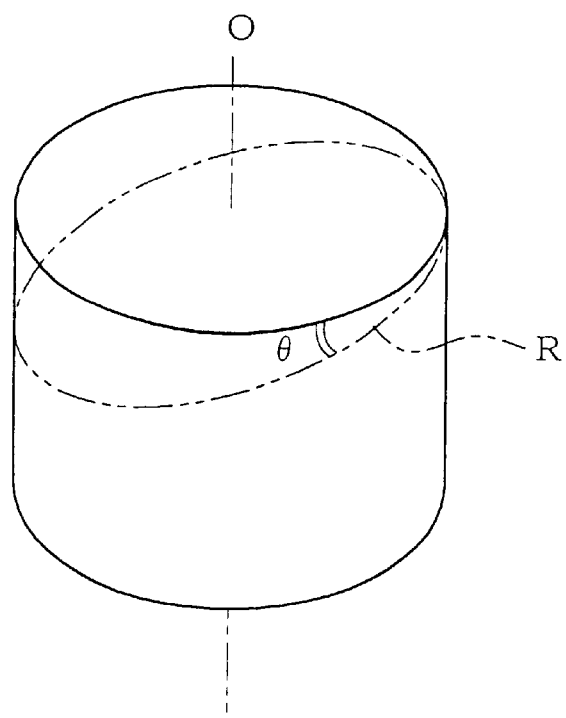
FIG. 6 is a schematic view showing an oval shape loop which defines the sloped step.
Figure 7:
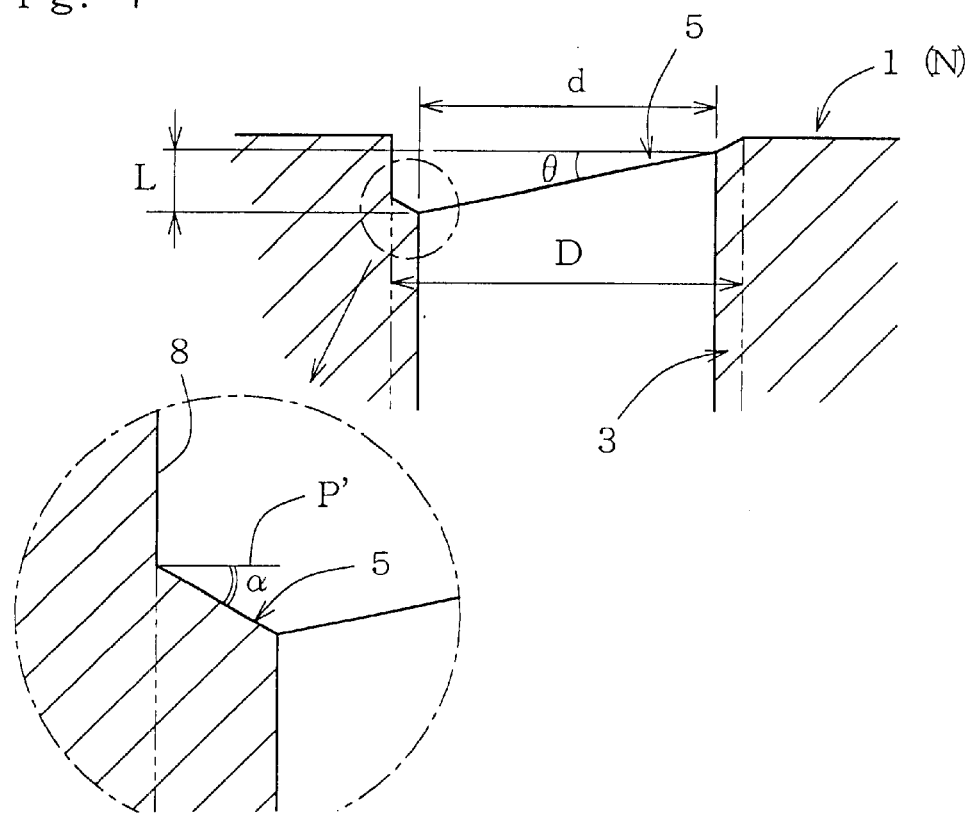
FIG. 7 is a schematic view of an arrangement of the sloped step extending along the loop shown in FIG. 6.

It is assumed that a plane P extends at an angle to the crosswise plane perpendicular to the center line O of the nut N as shown in FIGS. 4 and 5. Referring to FIG. 6, denoted by R is an oval shaped loop (an annular line) extending along the intersection between the plane P and the inner wall of the nut N. The sloped step (surface)5 is thus shaped of the annular form on the inner wall of the nut1(N) adjacent to the nut opening which faces outwardly of the nut 1 and substantially extends along the loop R, as schematically shown in FIG. 7. The inner diameter d of the inner wall of the sloped step5 measured at a right angle to the center line O of the nut1 is smaller than the major diameter D of a female thread3 of the nut1.

The degree of slope (or the angle θ) of the oval loop R to the crosswise plate perpendicular to the center line O, which determines the sloped step5, may be defined by the fact that the axial distance L of the loop R which is a difference between the outermost point nearest to the opening end the innermost point furthest from the same is smaller than two times the pitch of the female thread3 of the nut1. For example, the minimum of the distance L may be equal to 0.3 times the pitch. Accordingly, the distance L ranges from 0.3 to 2 times the pitch, preferably 0.8 to 1.2 times the pitch and more preferably, equal to the pitch.

If the distance L defining the sloping of the oval loop R is not greater than 0.3 times the pitch, the effect of corrective threading may hardly be achieved as is explained later. When the distance L is greater than two times the pitch, the crosswise stress (an yielding force) at the right angle to the axis may be increased during the forming of the sloped step 5 (by cool forging or punching). Also, the number of threads which extend through less than 360 degrees is increased, declining the threading strength. Therefore, the above range is preferable. Alternatively, the angle θ may range from 2 to 15 degrees and preferably, 5 to 10 degrees (most preferably 8 degrees). The same reason is applicable to this range of angles.

Also, as shown in FIG. 7, the sloped step 5 extending along the oval loop arranged at a given angle is beveled at an angle α from the crosswise plane P' perpendicular to the axis of the nut 1 so that its surface slops down towards the center of the opening of the nut 1. The angle α may range from 0.5 F to 1.5 F where F is the flank angle of the female thread of the nut 1. It is most preferable to have the beveling angle α of the sloped step 5 arranged substantially equal to the flank angle F. When the beveling angle α is too great, the function for corrective threading may be declined. If too small, the edge of the sloped step5 is almost at a right angle thus disturbing the inward movement of a bolt. Therefore, the angle within the above range is most preferable. Denoted by 8 is an inner wall connecting from the sloped step5 (which determines the depth (from the opening end) of the sloped step5 and may be regarded as a part of the step).

While the nut N shown in FIG. 7 indicates a concept of the sloped step5, the embodiment shown in FIGS. 1 to 3 is substantially identical to an actual product. As apparent from FIG. 3, the nut1 has a non threaded, tubular guide surface6 thereof (referred to as a tubular guide hereinafter) provided on the opening end side of the sloped step5 and arranged concentric with the center line O of the nut1. The inner diameter D' of the tubular guide6 is greater than the inner diameter (d in FIG. 7), extending perpendicular to the axis, of the annular edge of the sloped step5 while is slightly greater than the major diameter of the female thread of the nut 1. The tubular guide6 connects with the annular sloped step5. The opening side end of the tubular guide6 (at the opening end of the nut1) is beveled to have a beveled guide surface7 (referred to as a beveled guide hereinafter) widening towards the opening end of the nut1. The beveled guide7 connects at its narrower diameter end with the tubular guide6.

The length L1, along the axis of the nut1, of the tubular guide6 may preferably be 0.5 to 2 times the pitch o the female thread of the nut1. In this embodiment, the length L1 is substantially equal to the pitch. The length L2 between the opening side end of the tubular guide6 and the innermost end of the slope step5 may preferably be 1 to 3.5 times the pitch. In this embodiment, L2 is equal to 2 times the pitch. The bevel angle β of the beveled guide 7 may be 20 to 80 degrees and preferably 30 to 70 degrees. In this embodiment, the angle β ranges from 40 to 60 degrees. The length L3 (the depth long the axis of the nut1) of the beveled guide 7 may be 0.2 to 2 times the pitch of the female thread of the nut1 and preferably 0.2 to 1 times the pitch. In this embodiment, the angle β is substantially equal to 0.5 time the pitch.

Since the sloped step5, the tubular guide6, and the beveled guide7 are provided continuously in series as extend in three steps up to the opening end of the nut1, the nut1 can be functioned with its beveled guide7 guiding the insertion of a bolt or a male threaded member, its tubular guide6 roughly correcting the dislocation or tilting of the bolt or member from the nut1, and its sloped step5 acting as a rotating cam to establish the correct positional relationship between the bolt and the nut1. For the purpose, the tubular guide6 is lengthened as small as the pitch, hence allowing a comfortable length of the thread without spoiling the effect of corrective threading.

Figure 8A:
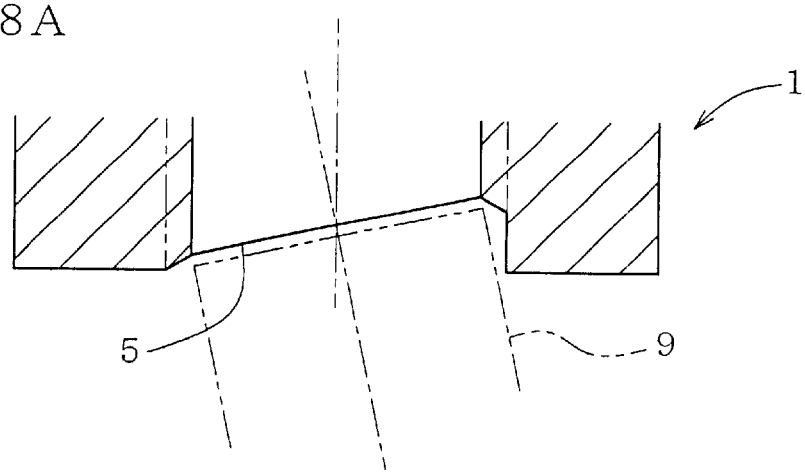
FIG. 8A shows a bolt positioned at an angle to the nut.
Figure 8B:
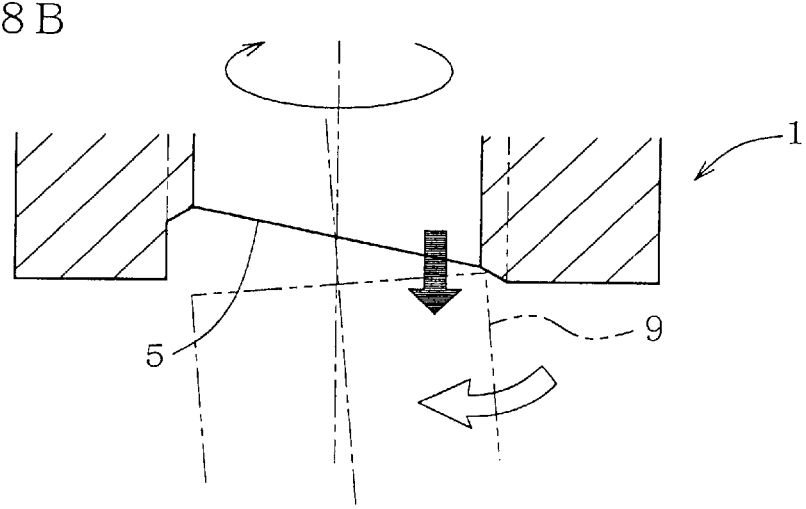
FIG. 8B shows a slope 5 in contact with an end of the bolt 9.
Figure 8C:
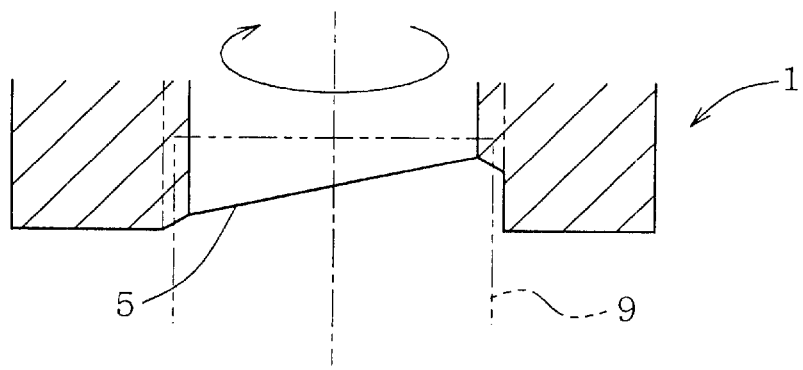
FIG. 8C shows the bolt aligned coaxially with the nut.

FIG. 8 schematically illustrates the action of corrective threading with the sloped step5. As shown in FIG. 8A, a bolt9 is positioned at an angle to the nut1 (the axes of the nut1 and the bolt9 tilting from each other). As shown in FIG. 8B, the nut1 turns relative to the bolt9 and causes its sloped step5 to come at a shallow region (including the edge) into direct contact with the end of the bolt9. Because the nut1 generates a force with the shallow region of its sloped step5 to draw the bolt9 straight (making both the nut1 and the bolt9 aligned coaxial with each other), the axis of the bolt9 substantially aligns with the axis of the nut1 as shown in FIG. 8C. Accordingly, the (start of) threading action between the two members will hardly create a fault of bite.

Figure 9A:
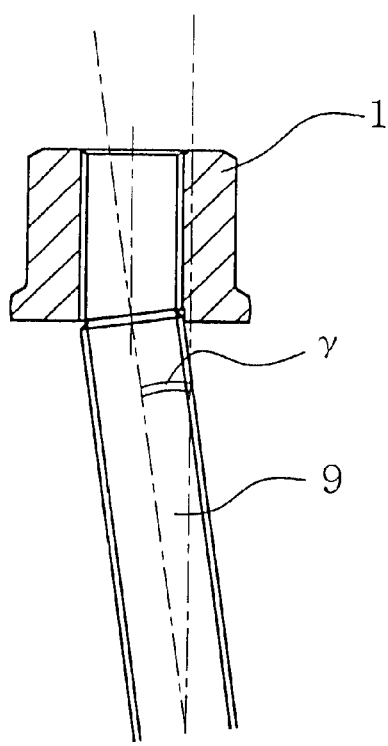
FIG. 9A is an explanatory view showing a bolt tilted relative to the nut before being threaded.
Figure 9B:
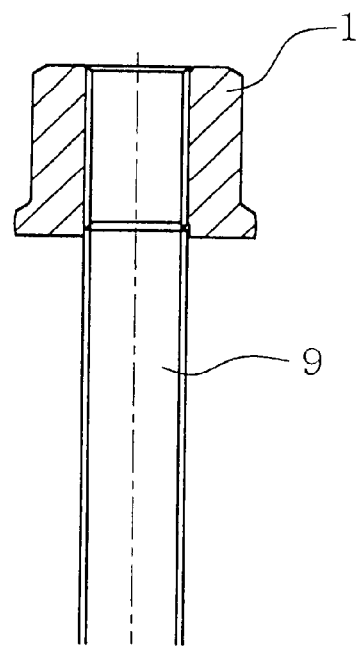
FIG. 9B shows the bolt normally threaded in the nut.

FIG. 9 illustrates such an advantageous function more practically. In case that the bolt9 is at an angle γ to the axis of the nut1, the action of corrective threading of the nut1 develops a force to eliminate the angle γ (or draw the bolt9 straight). When the angle γ between the nut1 and the bolt9 is substantially 2 or 3 degrees, the threading may be carried out without difficulty. Generally speaking, if the angle is 5 degrees or more (for example, 8 degrees), the smooth threading of a common nut onto a bolt will be disturbed. The nut1 of the present invention can readily be threaded onto the bolt9 while correcting its tilting at the angle γ of 8 degrees.

Figure 10A:
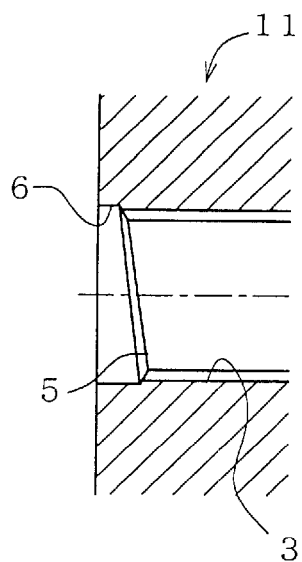
FIG. 10A shows a nut without a beveled guide 7.
Figure 10B:
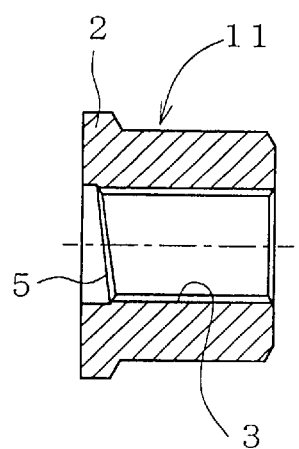
FIG. 10B is a cross section of FIG. 10A.
Figure 10C:
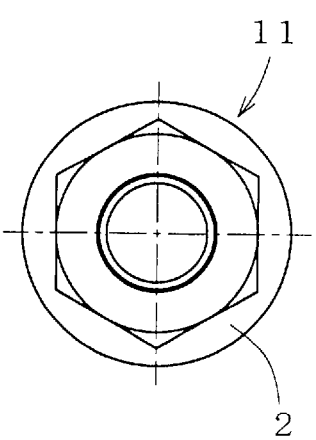
FIG. 10C is a right side view of FIG. 10B.

FIG. 10A illustrates a nut11 having the sloped step5 connecting from the tubular guide6 with no presence of the beveled guide7. FIG. 10B is a cross sectional view of the overall arrangement while FIG. 10C is a front view of the same.

Figure 11A:
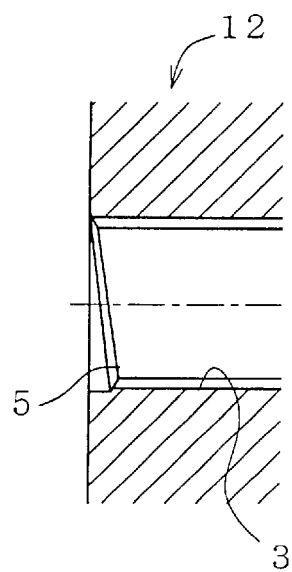
FIG. 11A shows a nut with a sloped step 5 and without a tubular guide 6 and beveled guide 7.
Figure 11B:
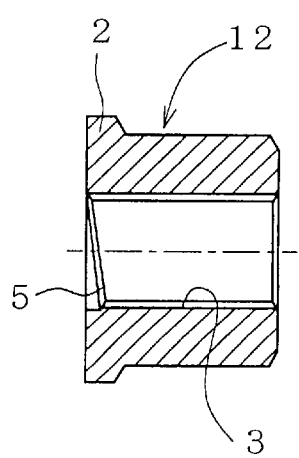
FIG. 11B is a cross section of FIG. 11A.
Figure 11C:
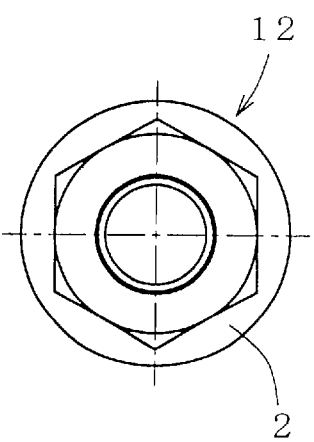
FIG. 11C is a right hand view of FIG. 11B.

FIG. 11 illustrates a nut12 having the sloped step5 with no presence of the tubular guide6 and the beveled guide7. FIG. 11A is an enlarged view, FIG. 11B is an overall cross sectional view, and FIG. 11C is a front view of the nut12. As the tubular guide6 is not provided at the opening side end of the sloped step5, the nut12 shown in FIG. 11 accommodates a comfortable length of the thread. Alternatively, when the sloped step5 is accompanied with a tubular guide6 like the nut11 shown in FIG. 10, the corrective threading can be performed at two different steps. In the latter case, the tubular guide 6 shown in FIG. 10 (substantially identical to the tubular guide6 shown in FIG. 3) acts as a fulcrum when accepting directly the leading end of the bolt9 as shown in FIG. 3 or 10 and simultaneously bearing a force of moment generated by the sloped step5 for correcting the tilting of the bolt9 as shown in FIG. 8 or 9.

Figure 12:
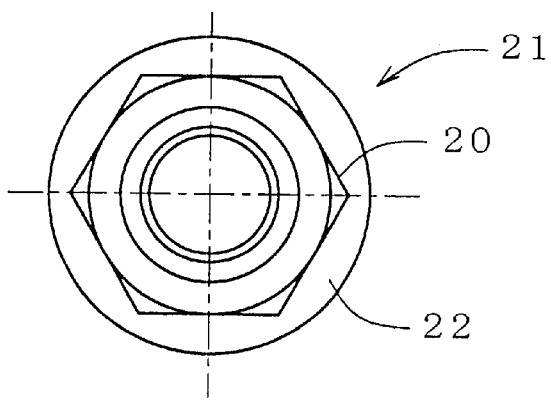
FIG. 12 is a front view of a hub nut showing a still further embodiment of the present invention.
Figure 13:
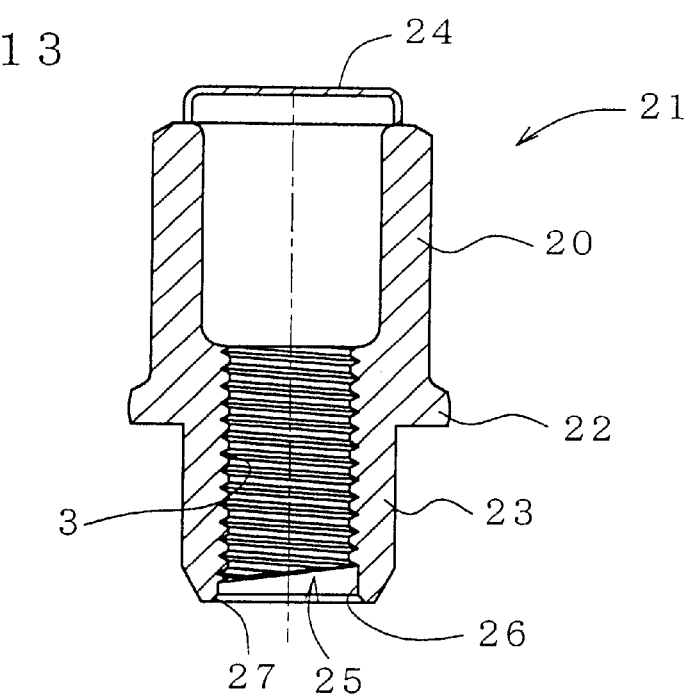
FIG. 13 is a longitudinal cross sectional view of the nut shown in FIG. 12.
Figure 14:
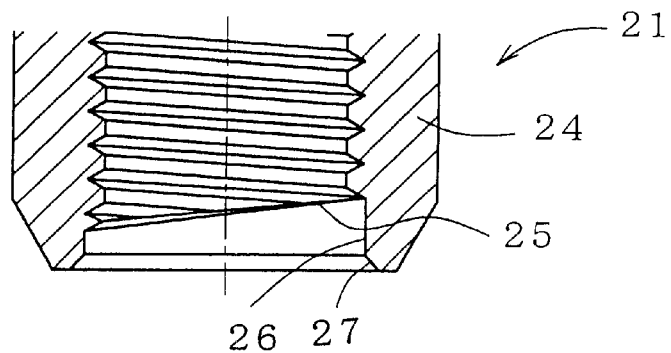
FIG. 14 is an enlarged cross sectional view of the nut shown in FIG. 13.

FIGS. 12 to 14 illustrate a cap (or hub) nut21 showing a further embodiment of the present invention. As best shown in a front view of FIG. 12 and a cross sectional view of FIG. 13, the hub nut21 is a tubular body comprising a tool engaging region or a hexagonal region20, a fitting region or a tubular (thread) region23 on the opposite side to the hexagonal region20, and a flange22 provided between the hexagonal region20 and the tubular region23. While a female thread3 extends over the tubular region23 and the flange22, the hexagonal region20 has an inner space provided therein for accepting a bolt. The hexagonal region 20 is closed and joined at one end with a cap 24 by welding or the like, hence constituting a cap nut.

The tubular (thread) region 23 has a sloped step 25, a tubular guide 26, and a beveled guide 27 provided along the axial direction on the opening side end thereof. FIG. 14 is an enlarged view of the same. The sloped step 25, the tubular guide 26, and the beveled guide 27 are substantially identical in shape to the sloped step 5, the tubular guide 6, and the beveled guide 7 shown in FIG. 3 and will be explained in no more detail.

In common, the hub nuts 21 are threaded on unshown hub bolts to secure a vehicle wheel to the hub of a vehicle axle. When tightened, the tubular region 23 is fitted in the wheel hole and the flange 22 is seated at the bottom on the wheel at the wheel hole. While the hub nut 21 being fitted on the corresponding hub bolt by use of an impact wrench or other tools, its dislocation or tilting from the axis of the hub bolt can be corrected by its action of corrective threading as shown in FIG. 8 or 9 and finally threaded in its correct position on the hub bolt.

Figure 15:
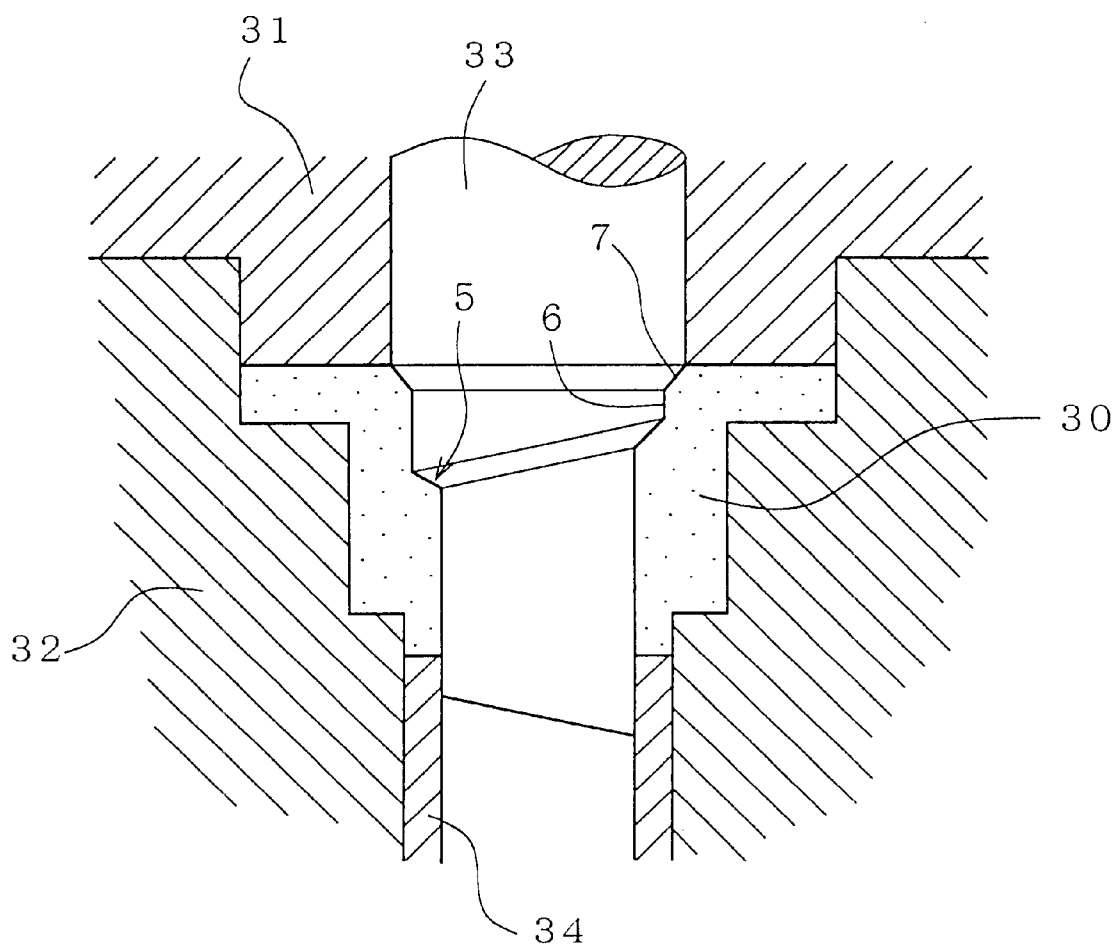
FIG. 15 is a cross sectional view showing a procedure of fabricating the nut of the present invention.

FIG. 15 illustrates a procedure of fabricating the prescribed nut of the embodiment. Shown in a process of cool forging a nut material 30 where the sloped step 5, the tubular guide 6, and the beveled guide 7 are formed on the nut material 30 by steps of punching with the use of cool forging punches and dies. More specifically, the nut material 30 is securely held with forging tools 31, 32 (a die), and 34 (a sleeve) and punched by a punch 33 to shape the sloped step 5 and, if desired, the tubular guide 6 and the beveled guide 7. After the cool forging process, the nut material 30 is threaded at its inner wall by machining or roll threading to have a female thread connecting from the sloped step 5. In other words, the process includes a series of step for cool forging the nut material 30 to shape the sloped step 5, a combination of the sloped step 5 and the tubular guide 6 or a full set of the sloped step 5, the tubular guide 6, and the beveled guide 7 and then threading the same to form a female thread extending inwardly from the sloped step 5.

In the above description, the sloped step (if desired, accompanied with the tubular guide and the beveled guide) is provided at one end of the nut because the nut has only one end opened and threaded for insertion of a bolt. Accordingly, while the nut has both ends opened and threaded, the sloped step (if desired, accompanied with the tubular guide and the beveled guide) can be provided to each end (including both ends of the nut). The two sloped steps may be shaped in symmetry or non-symmetry.

Also, in the above description, the female thread or its implementation is provided in the form of a nut. Alternatively, the female thread may be provided in an aperture formed in a plate or any other member as is connected to such a sloped step (if desired, accompanied with a tubular guide and a beveled guide) as described in the embodiments and positioned close to the opening end. This plate can hence has a function of corrective threading identical to that of the nut. The advantage of the nut of each embodiment of the present invention may be understood in respect to the female thread or its implementation.

The female thread or its implementation or its modification is not limited to a nut or the like which is turned for threading but may be provided in stationary relationship (i.e. its movement is prohibited by its construction). As the opposite member (for example, a bolt) is turned, the female thread or its implementation or its modification remaining stationary and provided with the sloped step (if desired, accompanied with the tubular guide and the beveled guide) can exhibit the effect of corrective threading upon accepting the opposite member.

A bolt of an embodiment of the present invention will now be described.

Figure 16:
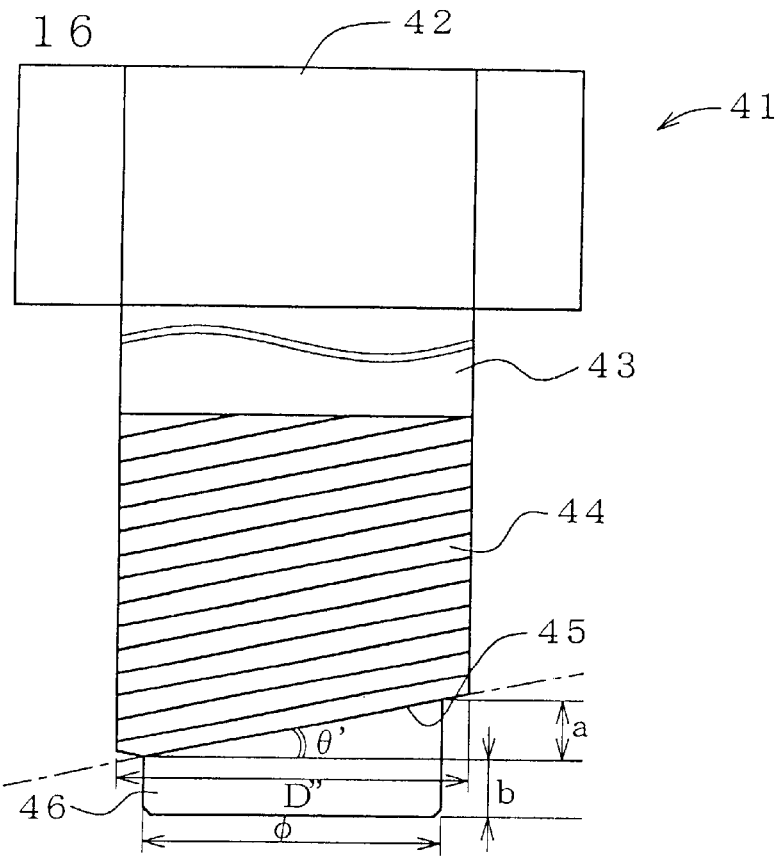
FIG. 16 is a schematic front view of a bolt showing an embodiment of the present invention.

FIG. 16 schematically illustrates the bolt 41 of the embodiment of the present invention which comprises a hexagonal head 42 (a tool engaging region) and a leg 43 provided at its surface with a male thread 44. The leg 43 has a corrective threading step 45 provided at the leading end thereof and a guide projection 46 thereof extending from the corrective threading step 45.

Figure 17:
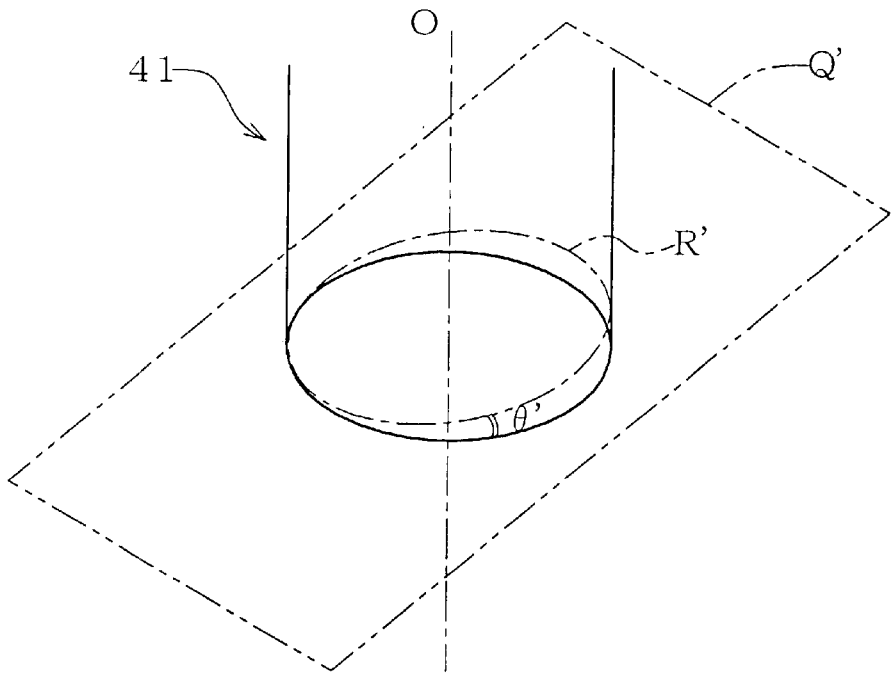
FIG. 17 is a perspective view schematically showing an oval shape loop which defines a corrective threading step of the bolt and is tilted.

As schematically shown in FIG. 17, the annular corrective threading step 45 is based on and extends along the oval shape loop R' (an annular line) defined at the intersection between a plane arranged at an angle θ' to the crosswise plane Q' perpendicular to the center line or axis of the bolt 41 and the outer edge of the bolt 41. The outer diameter D" (at a right angle to the axis) of the corrective threading step 45 which extends at a right angle to the center line of the bolt 41 (perpendicular to the axis) is greater than the minor diameter d' of the male thread of the bolt 41 (Also see FIG. 18). The male thread 44 is provided extending from the corrective threading step 45.

The angle θ' between the oval loop R' defining the corrective threading step 45 and the crosswise plane perpendicular to the center line O (or the axis) of the bolt 41 is determined with a difference a between the forward end of the loop R' most close to the leading end of the bolt 41 and the rearward end of the same most further from the leading end of the bolt 41. The distance a may substantially be equal to smaller than 3 times the pitch of the male thread 44, preferably smaller than 2.5 times the pitch, and more preferably smaller than 2 times the pitch. Also, the lower limit of the distance a may substantially be equal or greater than 0.3 times the pitch of the male thread 44, preferably greater than 0.5 times the pitch, and more preferably greater than 1.0 time the pitch. More particularly, the distance a may range from 0.3 to 3 times the pitch, preferably from 0.5 to 2.5 times the pitch, and more preferably 1.0 to 2 times the pitch. If the angle θ' or the distance a is too small, the effect of corrective threading will be declined. If too great, a more number of threads may be interrupted by the corrective threading step 45, hence shortening the overall length of the male thread 44. Also, this may generate a higher level of thrust (a bending force) during the forming of the corrective threading step 45 of the bolt 41 by cool forging. Therefore, the angle θ' ((or the distance a) should be within the above mentioned range.

The annular corrective threading step 45 extending along the tilted oval shaped loop is also beveled at an angle α' to the crosswise plane Q' perpendicular to the axis of the bolt 41 so as to taper down towards the leading end of the bolt 41. The bevel angle α' may substantially be equal to 0.3F to 2F where F is the flank angle of the male thread 44 and preferably 0.5F to 1.5F. Most preferably, the bevel angle is equal to the flank angle of the male thread 44. If the bevel angle α' of the corrective threading step 45 is too great, it may decline the effect of corrective threading of the corrective threading step 45. If too small (for example, zero), the edge of the leading end may possibly be injured. Therefore, the angle should stay within the above mentioned range.

The guide projection 46 extending from the corrective threading step 45 has a cylindrical shape of which the rearward end is defined by the corrective threading step 45. While the guide projection 46 concentrically extends along the axis of the bolt41, its leading end is arranged at a right angle to the center line O of the bolt41. The diameter φ of the guide projection46 is slightly smaller than the major diameter d' of the male thread44 of the bolt 41. Also, the distance b of the guide projection46 along the axis of the bolt41 may substantially be equal to 0.5 to 3 times the pitch of the male thread44, preferably 0.7 to 2 times the pitch, and more preferably 1 to 2 times the pitch (desirably 1.5 times the pitch).

Figure 19:
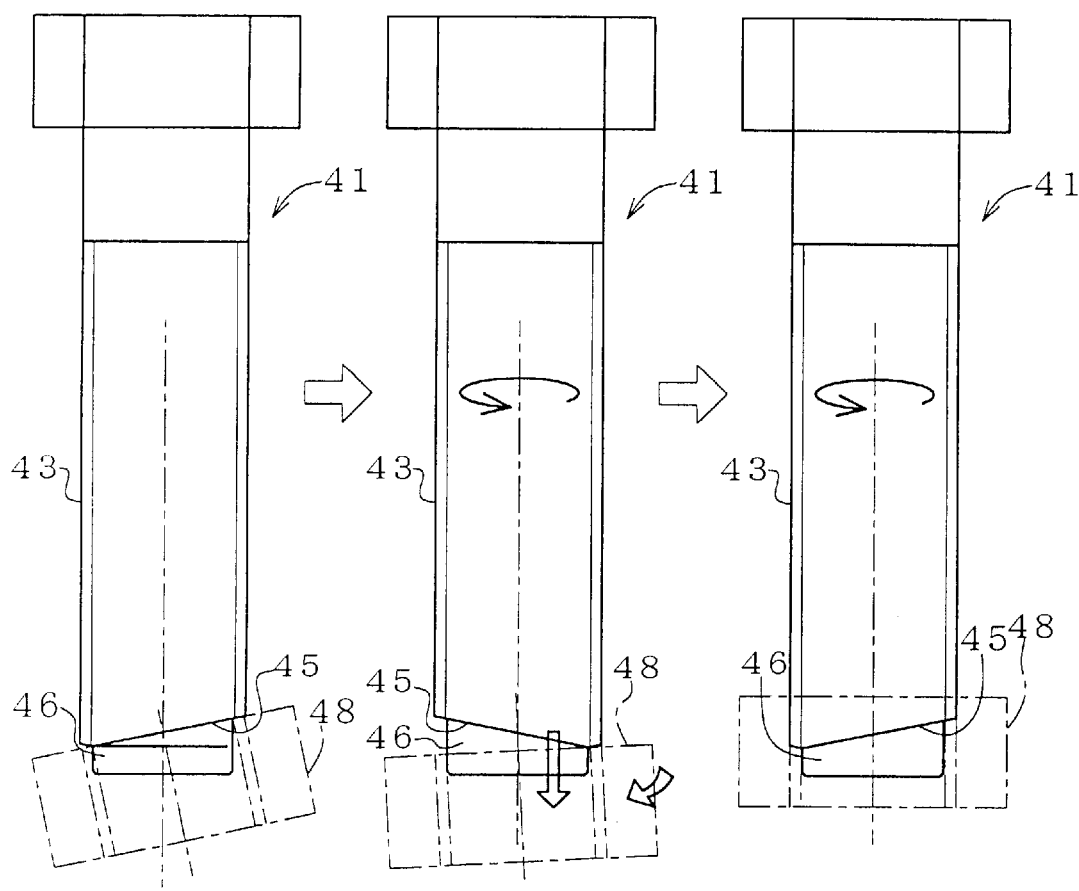
FIG. 19 is an explanatory view schematically showing an action of the bolt.

In action, as leading the corrective threading step 45, the guide projection46 can perform a preliminary action of roughly correcting the dislocation or tilting of the bolt 41 relative to a corresponding female threaded member such as a nut. If the distance b of the guide projection46 is too great, the male thread44 is shortened relative to the overall length of the bolt41. If too small, the function of correcting (or guiding) as leading the corrective threading step45 may be diminished. Therefore, the distance b is preferably within the above mentioned range. FIG. 19 is an explanatory view schematically showing the action of the bolt41.

As shown in FIG. 19A, the bolt41 is inserted into a nut48 as it is tilted. As the bolt41 turns relative to the nut48 with its guide projection46 guiding into the nut48, its corrective threading step45 engages at the forward end (closer to the leading end of the guide projection46) rather than the rear end with the inner wall of the nut48 thus creating a force of moment for correcting its tilted condition, as shown in FIG. 19B. Accordingly, as shown in FIG. 19C, the bolt41 is correctly aligned with its axis coinciding with the axis of the nut48 for having a normal threading state. Simultaneously, the guide projection46 guides the bolt41 into the female thread of the nut48 and desirably acts as a fulcrum (the center of the moment) for assisting the corrective threading step45 to generate the moment.

While the leading end of the guide projection46 is at a right angle to the axis of the bolt41 in this embodiment, it may be arranged tilting from the crosswise plane perpendicular to the axis of the bolt41 as is similar to the corrective threading step45. The leading end of the guide projection46 is not limited to a flat surface regardless of its tilting or not but may have a raised or bulged surface such as a semi-spherical (dome-like) shape. The guide projection46 is not limited to the cylindrical shape but may also be tapered (or reduced in the diameter toward the distal end) with its leading end made flat or bulged or raised outwardly (for example, to have a semi-spherical shape).

Figure 18:
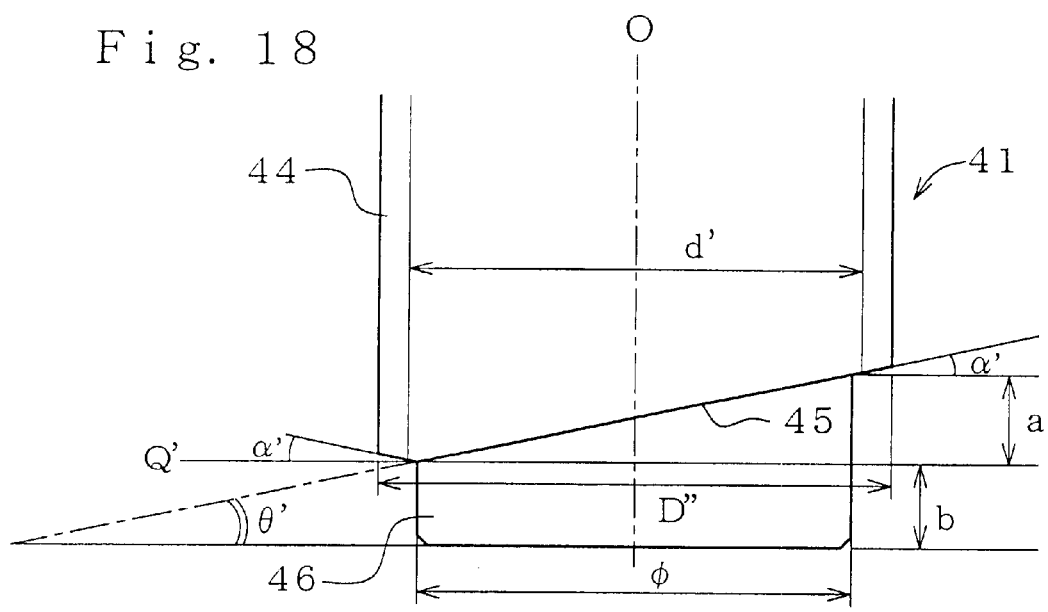
FIG. 18 is an enlarged cross sectional view of the bolt shown in FIG. 16.
Figure 20:
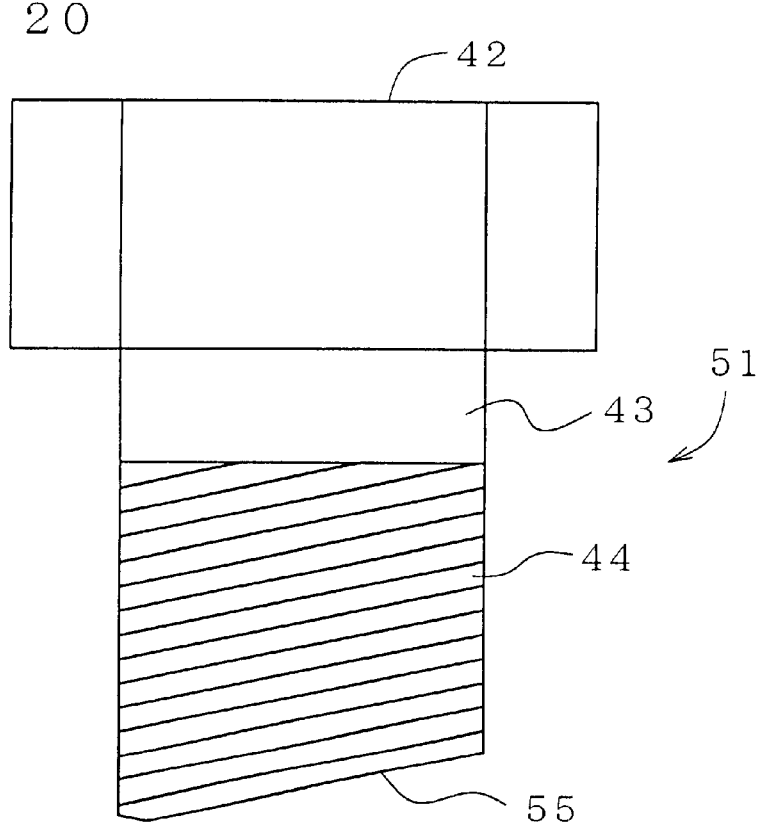
FIG. 20 is a front view of a bolt schematically showing another embodiment of the present invention.

FIG. 20 illustrates a bolt51 according to a still further embodiment of the present invention. The bolt51 is a modification of the bolt41 shown in FIG. 16 where the guide projection46 is eliminated and the leading end of the leg43 is tailored to form a corrective threading surface 55. The other arrangement is identical to that shown in FIG. 16. The bolt51, less the guide projection46, can also generate with its corrective threading surface55 a moment for correcting its tilting relative to a nut48 such as shown in FIG. 18, hence providing a normal threading state.

Figure 21:
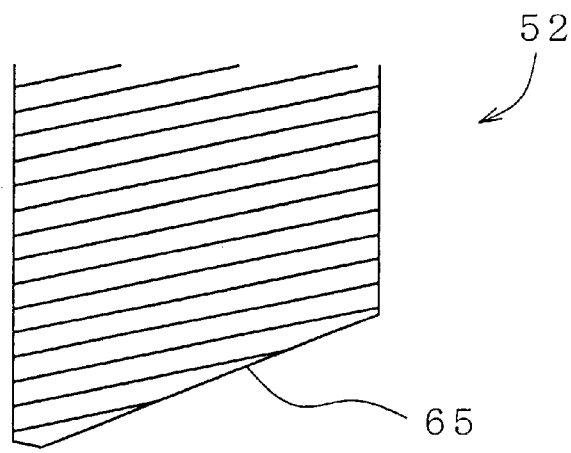
FIG. 21 is a view of a primary part of a bolt showing a further embodiment of the present invention.

FIG. 21 illustrates a primary part of a further bolt 52. The bolt52 has a corrective threading step65 sloped down from the distance (equal to a shown in FIG. 16) of greater than one time the pitch, preferably 2 or 3 times the pitch, or more. Meanwhile, the angle θ' of the corrective threading step45 shown in FIG. 16 or 18 may be set to 3 to 15 degrees, preferably 5 to 10 degrees, and more preferably 8 degrees. Those figures are based on the reason described about the distance a.

While the male thread or its implementation is described in the form of a bolt throughout the embodiments, it is not limited to such a narrowly defined term of bolt. The present invention is equally applicable to any male thread or its implementation (a widely defined concept of bolt). As any male thread or its implementation is provided with the foregoing corrective threading step (if desired, accompanied with the guide projection), it can successfully have the same function of corrective threading as of the bolts of the embodiments. Therefore, the bolts of the embodiments are only specified by the widely defined concept of bolt including any male thread, its implementation, and its modification.

Also, the male thread, or its implementation or its modification (the widely defined concept of bolt) is not limited to a bolt or the like which is turned for threading but may be provided in stationary relationship (i.e. its movement is prohibited by its construction). As the opposite member (for example, a nut) is turned, the male thread or its implementation or its modification remaining stationary and provided with the corrective threading step (if desired, accompanied with the guide projection) can exhibit the effect of corrective threading upon accepting the opposite member.

Although the above embodiments are described in the form of a bolt or a nut, the present invention is applicable to a combination of a bolt and a nut. For example, a female thread member selected from the nut1 shown in FIGS. 1 to 3, the nut11 and the nut 12 shown in FIGS. 10 and 11, and the nut21 shown in FIGS. 13 and 14 may be combined with a male thread member selected from the bolt41 shown in FIGS. 16 to 18 and the bolts 51 and 52 shown in FIGS. 19 and 20 to have a thread unit. The female thread member and the male thread member are as described above and will be described in no more detail.

Figure 22A:
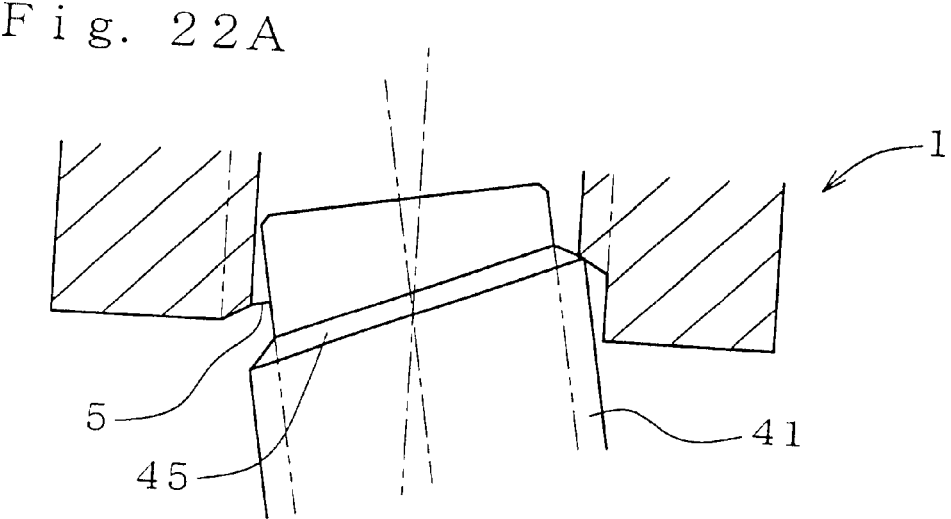
FIG. 22A shows the bolt tilted relative to the nut.
Figure 22B:
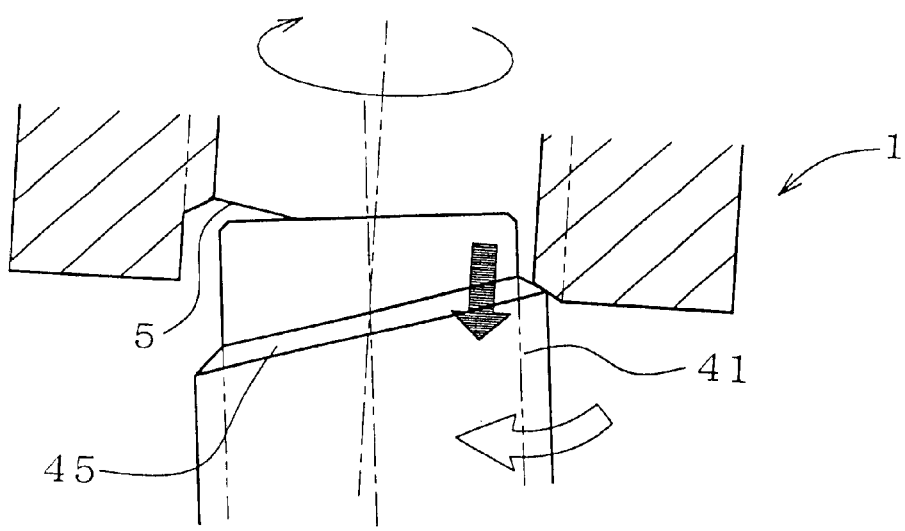
FIG. 22B shows the force moment for alignment of the nut and bolt.
Figure 22C:
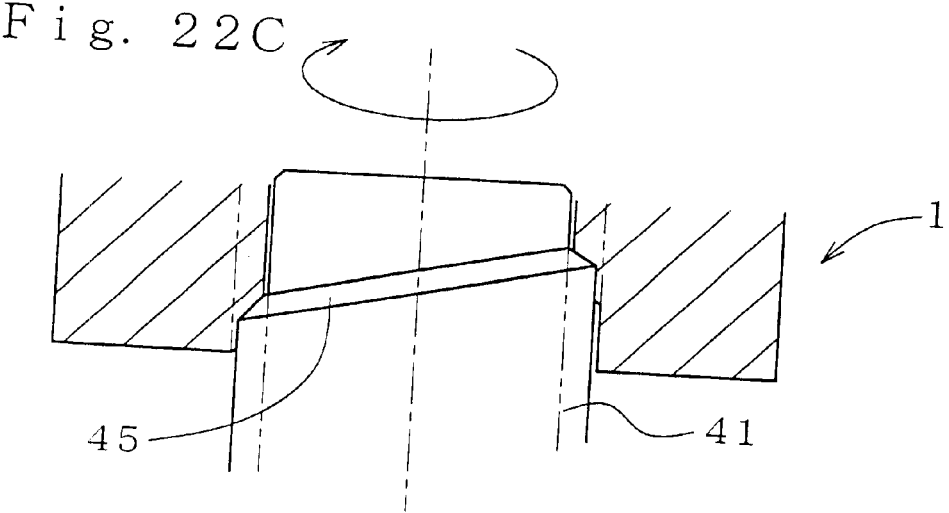
FIG. 22C shows the nut and bolt substantially aligned.

FIG. 22 schematically illustrates a combination of the corrective threading actions of the slope step5 (a corrective threading surface at the female thread) of the nut1 and the corrective threading step45 (a corrective threading surface at the male thread) of a bolt41. As shown in FIG. 22A, the bolt41 is tilted relative to the nut1 or the nut1 is tilted relative to the bolt41 or the bolt41 and the nut1 are tilted from each other (i.e. the axis of the bolt41 and the axis of the nut1 extend at an angle to each other). As the nut1 is turned relative to the bolt41 or the bolt41 is turned relative to the nut1 or the bolt41 and the nut1 are turned in opposite directions (i.e. the bolt41 and the nut1 are turned relative to each other), the innermost end (including the edge) of the sloped step5 of the nut1 moves along the corrective threading step45 of the bolt41 and finally comes into direct engagement with the forward end (including the edge) of the same. Simultaneously, while the engaging point acts as a fulcrum point, a force of moment (including a rotating moment) is generated for correcting the tilting of the bolt41 or the nut1 (to align the bolt 41 and the nut1 with each other along the common axis) as shown in FIG. 22B. Accordingly, as shown in FIG. 22C, the bolt41 and the nut1 are substantially aligned with each other along the common axis, hence preventing their biting each other at the start of threading.

Figure 23A:
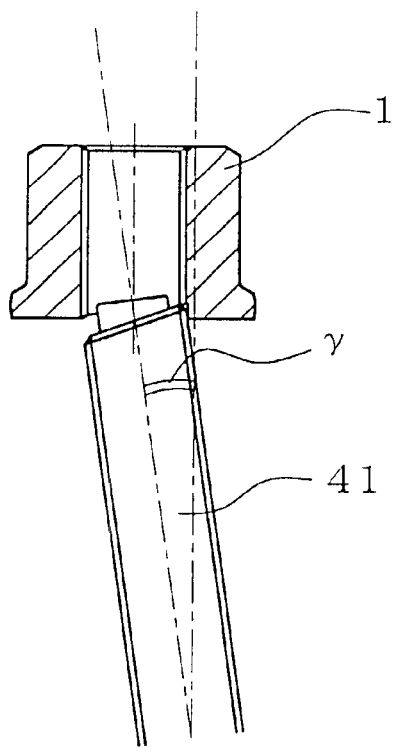
FIG. 23A is an explanatory view of the nut and the bolt tilted relative to each other before being threaded.
Figure 23B:
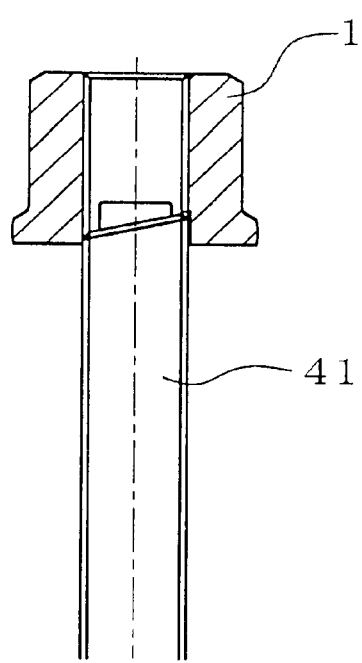
FIG. 23B shows the nut and bolt normally threaded with each other.

FIG. 23 illustrates the action of corrective threading more explicitly. The bolt41 or the nut1 when tilted at an angel γ to the opposite member (the nut1 or the bolt41) can carry out an action of corrective threading to eliminate its tilting (to align with nut1 or bolt41) while being screwed in. The angle γ between the bolt41 and the nut1 may be negligible when it is 2 or 3 degrees in common threading actions. However, if the angle γ is 5 degrees or greater (for example, 8 degrees), the threading of the bolt and the nut with each other will be difficult. A combination of the bolt41 and the nut1 of the present invention can be threaded with each other even when the angle γ is as great as 8 degrees. Since the two corrective threading steps 5 and 45 of the nut 1 and the bolt 45 cooperate with each other, the angle between the two members is as high as a sum of the distance L (FIG. 7) and the distance a (FIG. 16). Hence, when the maximum of the angle is shared by the nut 1 and the bolts 41, the two distances L and a can favorably be decreased (to ½ the original length determined by the sloped step provided on only one of the two members). As a result, the tilting can be corrected with the male thread of the bolt 41 and the female thread of the nut 1 arranged to a maximum length.

What is claimed is:

1. A nut characterized by an annular sloped step provided in a region of an inner wall adjacent to an opening end of the nut to substantially extend along an oval shaped loop (an annular line) defined by an intersection between the inner wall of the nut and a plane tilted at an angle to a crosswise plane perpendicular to a center line of the nut so that the annular sloped step faces outwardly of the nut for ease of corrective threading (engaging), wherein a diameter of an inner edge of the sloped step along the crosswise plane perpendicular to the center of the nut (at a right angle to a nut axis) is smaller than a major diameter of a female thread of the nut and the female thread extends inwardly from the sloped step.

2. A nut characterized by an annular sloped step provided in a region of an inner wall adjacent to an opening end of the nut to substantially extend along an oval shaped loop (an annular line) defined by an intersection between the inner wall of the nut and a plane tilted at an angle to a crosswise plane perpendicular to a center line of the nut so that the annular sloped step faces outwardly of the nut for ease of corrective threading, a diameter of an inner edge of the sloped step along the crosswise plane perpendicular to the center line of the nut (at a right angle to the axis) arranged smaller than a major diameter of a female thread of the nut and the female thread arranged extending inwardly from the sloped step, wherein a tubular guide is provided concentrically about the center line of the nut on a region of the inner wall of the nut on an opening end side of the annular sloped step where no female thread is formed, an inner diameter of the tubular guide arranged greater than a diameter of the inner edge of the annular sloped step at a right angle to the axis and slightly greater than a major diameter of the female thread of the nut, the tubular guide connecting to the annular sloped step.

3. A nut according to claim 2, wherein the length along the axis of the nut of the tubular guide is substantially equal to 0.5 to 2 times the pitch of the female thread of the nut.

4. A nut according to claim 1, wherein a degree of tilting from the center line of the nut of an oval shaped loop defining a shape of the sloped step is determined by a measurement of a difference along the axis of the nut between a nearest point and a furthest point of the loop to the opening end of the nut is not greater than 2 times a pitch of the female thread of the nut.

5. A nut according to claim 1, wherein a sloped step extending along the tilted oval shaped loop is beveled at an angle to a crosswise plane at a right angle to the axis of the nut so that its inner diameter becomes larger towards the opening end of the nut.

6. A nut according to claim 5, wherein the degree of tilting of the sloped step relative to the crosswise plane at a right angle to the axis of the nut is substantially equal to a flank angle of the female thread of the nut.

7. A nut according to claim 1, wherein the diameter of the outer edge of the sloped step along the crosswise plane at a right angle to the axis of the nut is slightly greater than a major diameter of the female thread of the nut.

8. A nut according to claim 1, wherein a beveled guide is provided concentrically of the female thread of the nut on an opening end region of the inner wall of the nut so that its inner diameter becomes greater towards the opening end and the sloped step extends inwardly from the smaller inner diameter end of the beveled guide.

9. A nut according to claim 2, wherein a beveled guide is provided concentrically of the female thread of the nut on an opening end region of the inner wall of the nut so that its inner diameter becomes greater towards the opening end, the tubular guide extends inwardly from a smaller inner diameter end of the beveled guide, and the sloped step extends inwardly from an innermost end of the tubular guide.

10. A bolt characterized by a corrective threading (engaging) step provided in a region of an outer surface adjacent to a leading end of the bolt to substantially extend along an oval shaped loop (an annular line) defined by an intersection between an outer surface of the bolt and a plane tilted at an angle to a crosswise plane perpendicular to a center line of the bolt, wherein a diameter of the outer edge of the corrective threading step along the crosswise plane perpendicular to the center line of the bolt (at a right angle to a bolt axis) is greater that a minor diameter of a male thread of the bolt and the male thread extends rearwardly from the corrective threading step.

11. A bolt according to claim 10, wherein a cylindrical guide projection is provided concentrically about the center line of the bolt on a region of the outer surface of the bolt at the leading end side of the annular corrective threading step, the outer diameter of the guide projection is smaller than the minor diameter of the male thread of the bolt.

12. A bolt according to claim 11, wherein the length along the axis of the bolt of the guide projection is substantially equal to 0.5 to 3 times the pitch of the male thread of the bolt.

13. A bolt according to claim 10, wherein a degree of tilting from the center line of the bolt of the oval shaped loop defining a shape of the corrective threading step is determined by the measurement of a difference along the axis of the bolt between a nearest point and a furthest point of the loop to the leading end of the bolt is not greater than 3 times a pitch of the male thread of the bolt.

14. A bolt according to claim 10, wherein the corrective threading step extending along the oval shaped loop is beveled at an angle to the crosswise plane at a right angle to the axis of the bolt so that it tapers down towards the leading end of the bolt.

15. A bolt according to claim 14, wherein a degree of tilting of the corrective threading step relative to the crosswise plane at a right angle to the axis of the bolt is substantially equal to a flank angle of the male thread of the bolt.

16. A thread unit of a female thread member and a male thread member threaded with each other, characterized in that the female thread member has an annular and sloped female thread side corrective threading step provided in a region of an inner wall adjacent to an opening end of the female thread member to substantially extend along an oval shaped loop (an annular line) defined by an intersection between the inner wall of the female thread member and a plane tilted at an angle to a crosswise plane perpendicular to a center line of the female thread member so that the female thread side corrective threading step faces outwardly of the female thread member for ease of corrective threading, a diameter of the inner edge of the female thread side corrective threading step along the crosswise plane perpendicular to the center line of the female thread member (at a right angle to the female member axis) arranged smaller than a major diameter of a female thread of the female thread member and the female thread arranged extending inwardly from the female thread side corrective threading step, the male thread member has an annular and sloped male thread side corrective threading step provided in a region of an outer surface adjacent to a leading end of the male thread member to substantially extend along an oval shaped loop (an annular line) defined by an intersection between an outer surface of the male thread member and a plane tilted at an angle to a crosswise plane perpendicular to a center line of the male thread member, a diameter of an outer edge of the male-thread side corrective threading step along the crosswise plane perpendicular to the center line of the male thread member (at a right angle to a male thread member axis) arranged greater than a minor diameter of a male thread of the male thread member and the male thread arranged extending rearwardly from the male thread side corrective threading step, and a threading is commenced through turning and engaging the female thread side corrective threading step of the female thread member and the male thread side corrective threading step of the male thread member directly with each other.

\* \* \* \* \*